United States Patent [19]

Imaoka et al.

[11] Patent Number: 4,722,550
[45] Date of Patent: Feb. 2, 1988

[54] SEAT ASSEMBLY FOR MOTOR VEHICLE

[75] Inventors: Naohiro Imaoka; Hitoshi Nakashima, both of Hiroshima, Japan

[73] Assignee: Mazda Motor Corporation, Hiroshima, Japan

[21] Appl. No.: 895,949

[22] Filed: Aug. 13, 1986

[30] Foreign Application Priority Data

Aug. 15, 1985 [JP] Japan .................. 60-180267

[51] Int. Cl.[4] .................. A47C 1/00; B60G 25/00
[52] U.S. Cl. .................. 280/727; 180/268; 180/282; 280/734; 297/DIG. 3
[58] Field of Search .............. 280/727, 728, 734, 735; 297/423, 284, DIG. 3, DIG. 8; 180/282, 268

[56] References Cited

U.S. PATENT DOCUMENTS

| 3,420,572 | 1/1969 | Bisland | 280/735 |
| 3,983,640 | 10/1976 | Cardullo | 297/DIG. 3 |
| 4,477,732 | 10/1984 | Mausner | 280/734 |
| 4,592,588 | 6/1986 | Isono | 297/DIG. 3 |
| 4,615,563 | 10/1986 | Kobayashi | 297/DIG. 3 |

Primary Examiner—Richard A. Bertsch
Attorney, Agent, or Firm—Burns, Doane, Swecker & Mathis

[57] ABSTRACT

A seat assembly for use in a motor vehicle which includes a seat accommodated in the motor vehicle, hardness changing members disposed within the seat and capable of changing a hardness of the seat, running conditions detecting sensors for detecting running conditions of the motor vehicle, an actuating device for actuating the hardness changing members and a controller for driving the actuating device in accordance with running conditions of the motor vehicle by receiving outputs from the running conditions detecting sensors.

22 Claims, 7 Drawing Figures

SEAT ASSEMBLY FOR MOTOR VEHICLE

BACKGROUND OF THE INVENTION

The present invention generally relates to a seat assembly and more particularly, to a seat assembly for use in a motor vehicle which is capable of changing a hardness or resiliency of a seat.

Conventionally, a seat for use in a motor vehicle is commonly settled in hardness by such a mechanical means as springs or the like. In order to obtain a comfortable ride according to a driver's preference, however, there has been proposed a seat assembly which is capable of changing the hardness of the seat by arranging a plurality of air bags within the seat and controlling a pressure of each air bag individually.

For example, Japanese Patent Laid-open Publication Tokkaisho No. 59-230833 discloses the seat assembly for use in the motor vehicle, wherein plural pairs of air bags are arranged in a cushion of a driver's seat and each pair of the air bags is connected to an air supply device through a change-over valve. Furthermore, there is arranged a pressure detecting device in each pair of the air bags. Both of the change-over valves and the pressure detecting devices are connected to a micro-computer which is operable through an operation board. By the above described arrangement, the hardness of the driver's seat can be manually adjusted according to the driver's preference by controlling the change-over valves and the air supply device through the operation board or can be automatically adjusted in compliance with a driver's attitude on the basis of values obtained from the human engineering and previously stored in the micro-computer.

In such seat assembly as mentioned above, however, since the pressures in the air bags are automatically controlled after a change of the driver's attitude has been detected, there has been some delay in controlling the hardness of the seat and as a result, the seat assembly of the above described type can not sufficiently cope with the comfortable ride for the driver.

SUMMARY OF THE INVENTION

Accordingly, an essential object of the present invention is to provide an improved seat assembly for use in a motor vehicle which is capable of giving a better ride to a driver and reducing a driver's fatigue by causing the seat to be changeable in hardness in compliance with running conditions of the motor vehicle.

Another object of the present invention is to provide a seat assembly for use in a motor vehicle of the above described type which is simple in construction and can be manufactured at low cost.

In accomplishing these and other objects, according to one preferred embodiment of the present invention, there is provided a seat assembly for use in a motor vehicle which includes a seat accommodated in the motor vehicle, hardness changing members disposed within the seat and capable of changing a hardness of the seat, running conditions detecting means for detecting running conditions of the motor vehicle, an actuating means for actuating the hardness changing members and a controller for driving the actuating means in accordance with running conditions of the motor vehicle by receiving outputs from the running conditions detecting means.

BRIEF DESCRIPTION OF THE DRAWINGS

These and other objects and features of the present invention will become apparent from the following description taken in conjunction with the preferred embodiment thereof with reference to the accompanying drawings, throughout which like parts are designated by like reference numerals, and in which:

FIG. 4b is a sectional view, on an enlarged scale, of an air supply means as shown by A in FIG. 4a;

DETAILED DESCRIPTION OF THE INVENTION

Figure 1:
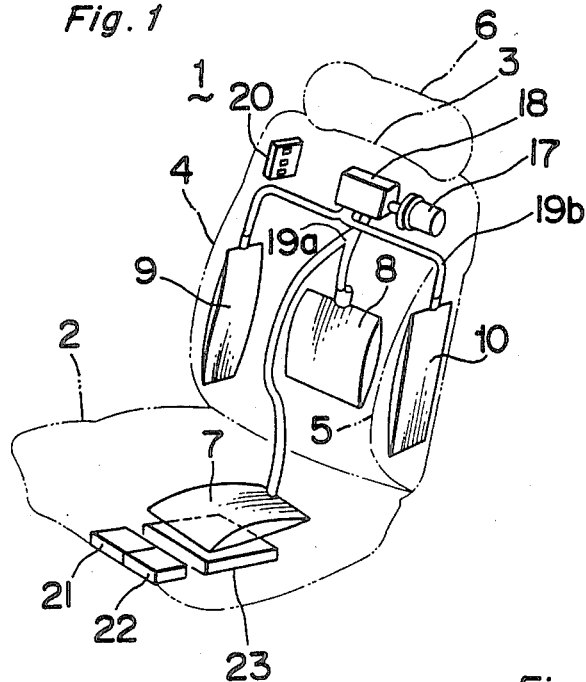
FIG. 1 is a perspective view showing general construction of a seat assembly for use in a motor vehicle of the present invention according to one preferred embodiment thereof.

Referring not to the drawings, FIG. 1 illustrates a general construction of a seat assembly for use in a motor vehicle according to one preferred embodiment of the present invention, wherein a seat 1 is composed of a seat cushion 2, a seat back 3, a pair of side supports 4 and 5 and a head rest 6.

The seat cushion 2, seat back 3 and side supports 4 and 5 internally accommodate air bags 7, 8, 9 and 10 respectively, as hardness changing members for changing hardness or resiliency of the seat 1.

Figure 2:
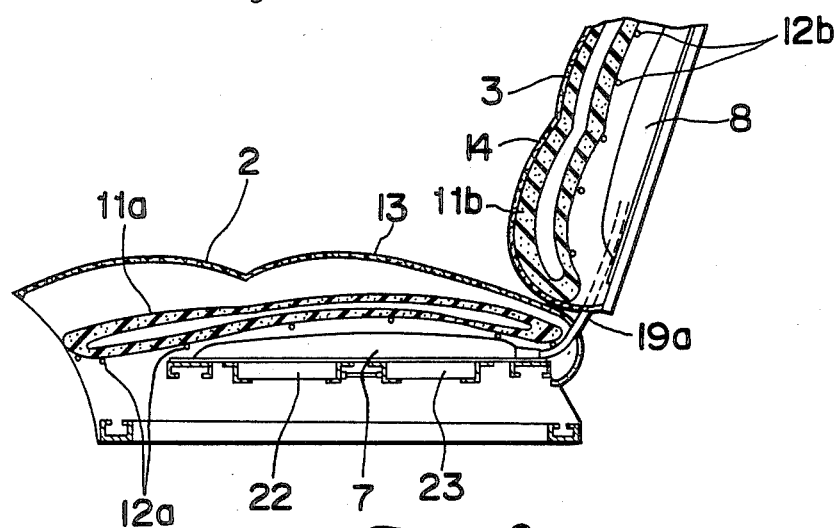
FIG. 2 is a sectional view of a seat cushion and the lower portion of a seat back of the seat assembly of FIG. 1.

As shown in FIG. 2, the air bags 7 and 8 accommodated in the seat cushion 2 and seat back 3 are disposed below springs 12a and behind another springs 12b for supporting cushions 11a and 11b, respectively and when the air bags 7 and 8 are filled with air, they project towards a front skin 13 of the seat cushion 2 and towards a front skin 14 of the seat back 3 respectively so as to increase the hardness thereof. Although the side supports 4 and 5 are not shown in FIG. 2, the air bags 9 and 10 accommodated therein function likewise.

Figure 3:
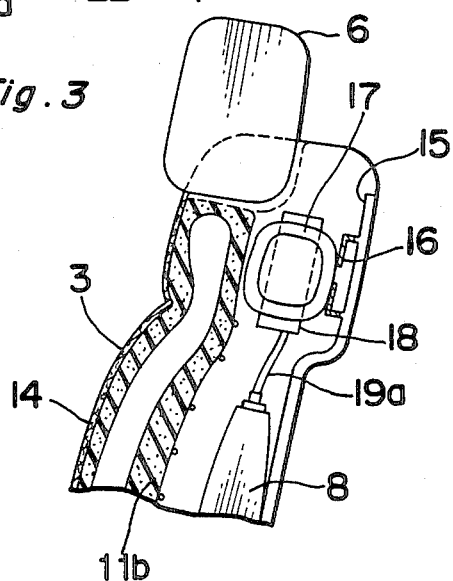
FIG. 3 is a sectional view of the upper portion of the seat back of the seat assembly of FIG. 1.

There are shown in FIG. 3, a frame 15 disposed at the rear portion of the seat back 3 and an air pump 17 arranged on the frame 15 through brackets 16 for securely mounting the air pump 17 thereon, said air pump 17 being connected to each of the air bags 7, 8, 9 and 10 through an air supply means 18 and a main air pipe 19. A hardness changing means is so constructed as described above for changing the hardness of the seat 1 by controlling the supply of air to the air bags 7, 8, 9 and 10.

Furthermore, a manual operation switch 20 is arranged in the vicinity of the side support 4 or 5 and there is disposed a running conditions detecting means composed of a speed sensor 21, a steering angle detecting sensor 22 and a controller 23 at the lower portion of the seat cushion 2. Thus, each air bag 7, 8, 9 or 10 can be manually controlled in hardness into one of following states by the manual operation switch 20 or can be automatically controlled in accordance with outputs from the speed sensor 21 and the steering angle detecting sensor 22.

(1) All of the air bags 7, 8, 9 and 10 are softened.
(2) All of the air bags 7, 8, 9 and 10 are hardened.
(3) Only the air bags 9 and 10 in the side supports 4 and 5 are hardened.

Figure 4B:
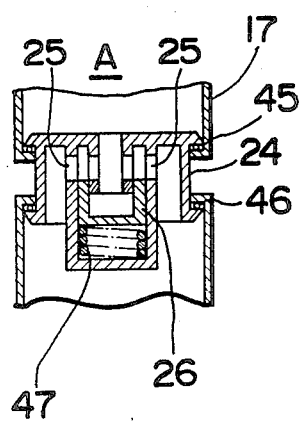
Figure 4A:
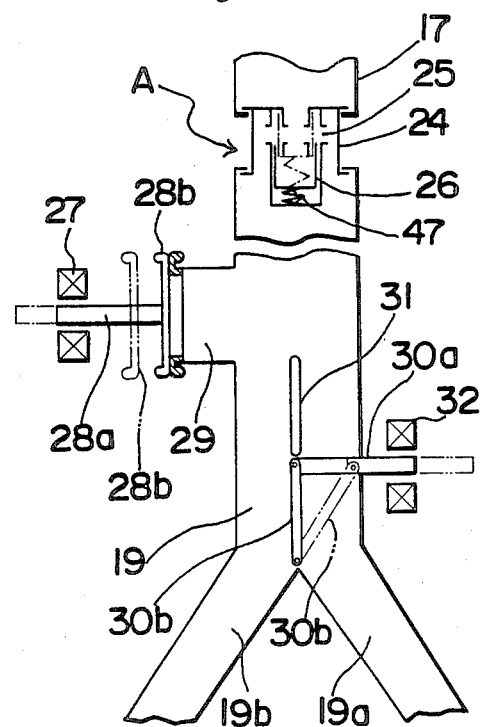
FIG. 4a is a fragmentary schematic view of a communicating portion between an air pump and air bags employed in the seat assembly of FIG. 1.

As shown in FIGS. 4a and 4b, the aforementioned air supply means 18 includes a connecting member 24 for connecting an outlet side of the air pump 17 with the main air pipe 19 communicating each of the air bags 7, 8, 9 and 10 through seal members 45 and 46, and a valve 26 which is freely reciprocable in the connecting member 24. A pair of through-openings 25 are defined on the connecting member 24 for communicating the air pump 17 with the air pipe 19, and the valve 26 is urged by a spring 47 so as to ordinarily close the through-openings 25 as shown by a single dotted line in FIG. 4a and is caused to open the through-openings 25 as shown by a solid line in FIG. 4a or as shown in FIG. 4b, when it has received a pressure over a predetermined value by the air pump 17. Moreover, there are disposed an on-off valve 28b, a reciprocable rod 28a connected to the valve 28b and a first solenoid 27 for actuating the rod 28a in the vicinity of the air supply means 18 for opening the air bags 7, 8, 9 and 10 to the atmosphere through the air pipe 19 and an opening 29 defined thereon in a manner that upon releasement of the first solenoid 27 from energized condition, the rod 28a is moved so as to cause the on-off valve 28b to open the opening 29, while the opening 29 is closed by the on-off valve 28b, when the first solenoid 27 is energized.

The main air pipe 19 is branched, at the downstream side of the opening 29, into a branch pipe 19a communicating the air bags 7 and 8 in the seat cushion 2 and the seat back 3, and another branch pipe 19b communicating the air bags 9 and 10 in the side supports 4 and 5. There are disposed a separating wall 31, a pivotable change-over valve 30b, a reciprocable rod 30a connected to the valve 30b and a second solenoid 32 for actuating the rod 30a, in the vicinity of the position where the main pipe 19 is branched into two. When a turning of the motor vehicle is detected by the speed sensor 21 and the steering angle detecting sensor 22, the second solenoid 32 is energized by the controller 23 and upon reciprocation of the rod 30a, the change-over valve 30b is pivotably moved so as to close the branch pipe 19a communicating the air bags 7 and 8 in the seat cushion 2 and the seat back 3.

Subsequently, with reference to FIG. 5, a circuit for the controller 23 according to the present invention will be explained hereinafter. It is to be noted that the circuit in FIG. 5 represents only one example of the present invention and that the present invention is not limited thereby, but may be modified in various ways within the scope.

Figure 5:
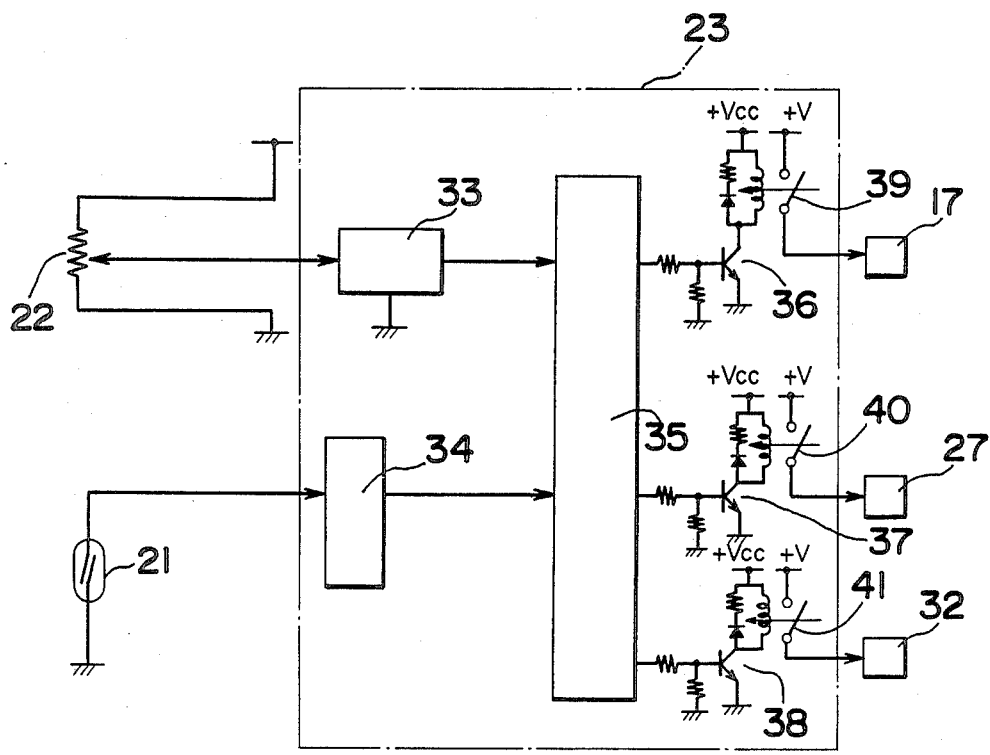
FIG. 5 is a schematic diagram of a controller employed in the seat assembly of FIG. 1.

In FIG. 5, both of an output from the steering angle detecting sensor 22 and an output from the speed sensor 21 are applied to a CPU (Central Processing Unit) 35 through an A/D (Analogue/Digital) converter 33 and an interface 34, respectively and in compliance with these outputs, signals outputted from CPU 35 are directed to a first, a second and a third transistors 36, 37 and 38 which control the air pump 17, the first solenoid 27 and the second solenoid 32, respectively. When the first, second and third transistors 36, 37 and 38 receive the signals on their bases, they are charged with electric current and as a result, since a first, a second and a third relay switches 39, 40 and 41 are energized and are turned on, the air pump 17 is driven and the solenoids 27 and 32 are energized. Hereupon, when the air bags 7, 8, 9 and 10 are pressurized over a predetermined value, the air pump 17 stops the supply of air.

In the above described construction, in the case where the motor vehicle is running at relatively low speed below a first predetermined speed $V_L$, since none of the transistors 36, 37 and 38 is charged with electric current, the air pump 17 is not driven and none of the solenoids 27 and 32 is energized. Accordingly, as the on-off valve 28b is brought to an open position as shown by a double dotted line in FIG. 4a and the change-over valve 30b is brought to the normal position where the main pipe 19 communicates both of the branch pipes 19a and 19b without any interception thereby as shown by a solid line in FIG. 4a, all of the air bags 7, 8, 9 and 10 are opened to the atmosphere through the opening 29, thus resulting in that since the air filled in the air bags 7, 8, 9 and 10 is released therefrom to the atmosphere and they are caused to be soft, all of the seat cushion 2, seat back 3 and side supports 4 and 5 are decreased in hardness and the driver feels comfortable to drive.

On the contrary, in the case where the motor vehicle is running at relatively high speed over a second predetermined speed $V_H$, since the first and second transistors 36 and 37 are charged with electric current and the third one 38 is not, the air pump 17 is driven and the first solenoid 27 is energized to bring the on-off valve 28b to a close position as shown by a solid line in FIG. 4a, with the change-over valve 30b being kept in the normal position owing to the fact that the second solenoid 32 is not still energized. Consequently, since each of the air bags 7, 8, 9 and 10 is supplied with air from the air pump 17 through the air pipes 19, 19a and 19b, all of the seat cushion 2, seat back 3 and side supports 4 and 5 are increased in hardness and this fact relieves the driver's fatigue.

Furthermore, in the case where the turning of the motor vehicle is detected by the speed sensor 21 and the steering angle detecting sensor 22 when the motor vehicle is running, all of the transistors 36, 37 and 38 are charged with electric current so that the air pump 17 is driven and both of the solenoids 27 and 32 are energized so as to bring the on-off valve 28b to the close position and the change-over valve 30b to an interception position as shown by a double dotted line in FIG. 4a. Accordingly, since the communication between the main pipe 19 and the branch pipe 19b is intercepted, the air is not supplied to the air bags 7 and 8 in the seat cushion 2 and seat back 3, but supplied only to those 9 and 10 in the side supports 4 and 5, thus resulting in that the latter are increased in hardness and prevent the driver from falling down sidewards. In addition, when the seat 1 is entirely hardened by all of the air bags 7, 8, 9 and 10 filled with air in the case where the motor vehicle is running at high speed, the present state is maintained even if the turning of the motor vehicle is detected at the time when it turns a corner or at the similar case.

It is to be noted that in the above described embodiment, although the hardness of the seat 1 is controlled in compliance with the outputs from the speed sensor 21 and the steering angle detecting sensor 22, the driver can be given a comfortable ride by controlling the hardness of the seat 1 in compliance with the output only from the speed sensor 21, with the steering angle detecting sensor 22 being omitted, and as a result, the driver's fatigue can be reduced.

Figure 6:
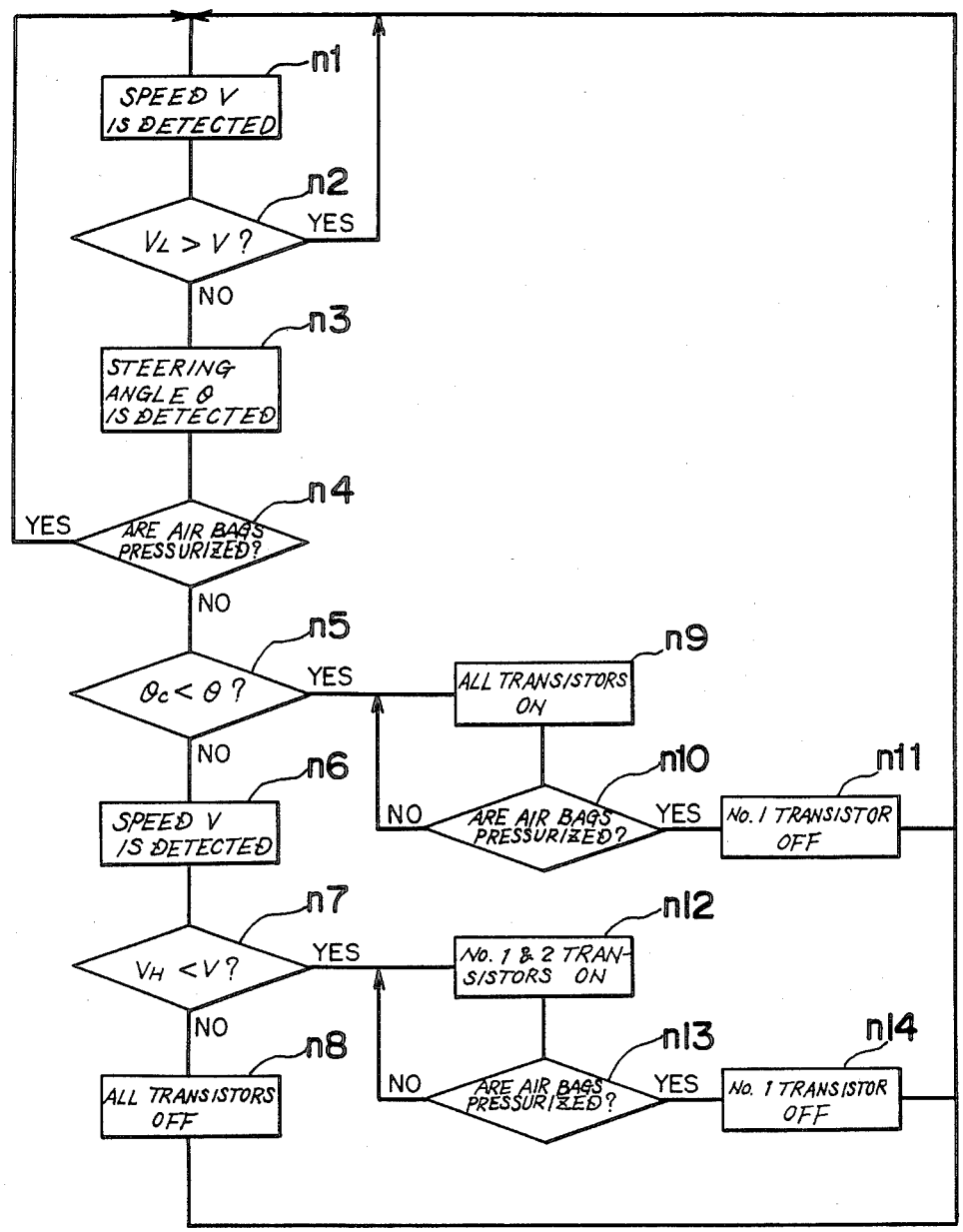
FIG. 6 is a flow-chart for explaining specific functions of the seat assembly according to one preferred embodiment of the present invention.

Referring further to FIG. 6, there is shown a flowchart for explaining functionings of the seat assembly for use in the motor vehicle according to the present invention.

In FIG. 6, the speed V of the motor vehicle is detected by the speed sensor 21 at step n1 and it is compared with the first predetermined value $V_L$ at step n2, and if V is larger than $V_L$, the steering angle $\theta$ is detected by the steering angle detecting sensor 22 at step n3. Subsequently, it is judged whether or not the air bags 7 and 8 are pressurized over a predetermined air pressure P at step n4 and if the judgment at this step is "NO", the procedure proceeds to step n5, in which the steering angle $\theta$ of the motor vehicle is compared with a predetermined value $\theta c$. When $\theta$ is smaller than $\theta c$ at step n5, the speed V of the motor vehicle is detected again at step n6. At subsequent step n7, it is judged whether or not the speed V is larger than the predetermined value $V_H$, and if the judgment at this step is "NO", all of the first, second and third transistors 36, 37 and 38 are kept to be OFF at step n8 and thereafter, the procedure returns to step n1.

In the case where V is smaller than $V_L$ at step n2 or in the case where the pressure in the air bags 7 and 8 exceeds the predetermined value P at step n4, the procedure also returns to step n1.

Furthermore, if $\theta$ is larger than $\theta c$ at step n5, all of the transistors 36, 37 and 38 are turned ON at step n9 and it is judged whether or not the pressure in the air bags 9 and 10 exceeds the predetermined value P at step n10, and if the judgment is "YES", the first transistor 36 turns OFF at step n11. Thereafter, the procedure returns to step n1. If the judgment at step n10 is "NO", the procedure returns to step n9.

Moreover, if the judgment at step n7 is "YES", both of the first and second transistors 36 and 37 are turned ON at step n12 and it is judged whether or not the pressure in the air bags 7, 8, 9 and 10 exceeds the predetermined value P at step n13, and if the judgment is "YES", the first transistor 36 turns OFF at step n14. Thereafter, the procedure returns to step n1. If the judgment at step n13 is "NO", the procedure returns to step n12.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A seat assembly for use in a motor vehicle which comprises:
    a seat member accommodated in said motor vehicle and having of a seat back and a seat cushion;
    a seat spring accommodated in said seat member;
    a hardness changing member comprising an air bag, and disposed within said seat member and below said seat spring, and for changing a hardness of said seat member;
    a running condition detecting means for detecting a running condition of said motor vehicle;
    an actuating means for actuating said hardness changing member; and
    a controller means for driving said actuating means in accordance with a running condition of the motor vehicle by receiving an output from said running condition detecting means.

2. A seat assembly for use in a motor vehicle as claimed in claim 1, wherein said actuating means is an air pump, said seat assembly further comprising change-over means for changing over the air supply to said air bags and air pipes including a main air pipe disposed at the downstream side of said air pump and branch pipes branched from said main air pipe, with said change-over means being disposed at a branched portion of said air pipes and said air bags being supplied with compressed air produced by said air pump through said air pipes.

3. A seat assembly for use in a motor vehicle as claimed in claim 2, further comprising an on-off valve, a first rod connected to said on-off valve and a first solenoid for actuating said rod together with said on-off valve, wherein an opening is defined on said main air pipe communicating said change-over means and said air pump, and is opened and closed by said on-off valve.

4. A seat assembly for use in a motor vehicle as claimed in claim 2, further comprising a connecting member having through-openings defined thereon and connectively disposed between the output side of said air pump and said main air pipe, and a valve urged so as to normally close said through-openings and moved by the air pressure from said air pump so as to communicate said air pump and said main air pipe.

5. A seat assembly for use in a motor vehicle as claimed in claim 2, wherein said main air pipe is branched, at said branched portion, into a branch pipe directed towards said side support portions and another branch pipe directed towards said seat back and said seat cushion, with a change-over valve composing said change-over means being disposed at said branched portion.

6. A seat assembly for use in a motor vehicle as claimed in claim 5, wherein said change-over means comprises said change-over valve, a second rod and a second solenoid for actuating said rod together with said change-over valve, with said change-over valve having one end pivotally connected to said branched portion and the other end securely connected to said rod for being operated thereby through actuation thereof by said solenoid.

7. A seat assembly for use in a motor vehicle as claimed in claim 5, further comprising a separating wall disposed at the side of said air pump of said change-over valve.

8. A seat assembly for use in a motor vehicle as claimed in claim 2, wherein said air pump is disposed inside said seat members.

9. A seat assembly for use in a motor vehicle as claimed in claim 2, wherein said controller is disposed inside said seat members.

10. A seat assembly for use in a motor vehicle as claimed in claim 1, wherein said seat member includes a seat back and a seat cushion.

11. A seat assembly for use in a motor vehicle which comprises:
    seat members accommodated in the motor vehicle and composed of a seat back and a seat cushion;
    hardness changing members disposed within said seat members and capable of changing a hardness of said seat members;
    running conditions detecting means for detecting running conditions of the motor vehicle;

an actuating means for actuating said hardness changing members;

a controller for driving said actuating means in accordance with running conditions of the motor vehicle by receiving outputs from said running conditions detecting means; and wherein said running conditions detecting means is a speed sensor and said controller is capable of controlling said actuating means by receiving an output from said speed sensor so as to increase the hardness of said seat assembly as the motor vehicle is increased in its speed.

12. A seat assembly for use in a motor vehicle as claimed in claim 11, wherein said controller controls said actuating means by receiving an output from said speed sensor so as to increase the hardness of said seat cushion and seat back as the speed of the motor vehicle has been increased.

13. A seat assembly for use in a motor vehicle as claimed in claim 11, wherein said hardness changing members are air bags disposed at the back of seat springs located inside said seat members.

14. A seat assembly for use in a motor vehicle which comprises:

seat members accommodated in the motor vehicle and composed of a seat back and a seat cushion;

hardness changing members disposed within said seat members and capable of changing a hardness of said seat members;

running conditions detecting means for detecting running conditions of the motor vehicle;

an actuating means for actuating said hardness changing members;

a controller for driving said actuating means in accordance with running conditions of the motor vehicle by receiving outputs from said running conditions detecting means; and wherein said running conditions detecting means is a sensor for detecting a turning of the motor vehicle and said controller is capable of controlling said actuating means by receiving an output from said sensor so as to increase the hardness of said seat assembly at the time when the turning of the motor vehicle is detected.

15. A seat assembly for use in a motor vehicle as claimed in claim 14, wherein said seat members further include a plurality of said supports and said controller controls said actuating means by receiving an output from said sensor for detecting the turning of the motor vehicle so as to increase the hardness of said side supports at the time when the motor vehicle turns.

16. A seat assembly for use in a motor vehicle as claimed in claim 14, wherein said sensor for detecting the turning of the motor vehicle is a steering angle detecting sensor for detecting a steering angle of the motor vehicle.

17. A seat assembly for use in a motor vehicle which comprises:

a seat member accommodated in said motor vehicle;

a hardness changing member disposed within said seat member and capable of changing a hardness of said seat member;

a running condition detecting means including a speed sensor for detecting a speed of said motor vehicle and a steering angle detecting sensor for detecting a steering angle of said motor vehicle;

an actuating means for actuating said hardness changing member; and a controller for driving said actuating means in accordance with said speed and steering angle of said motor vehicle by receiving outputs from said running condition detecting means.

18. A seat assembly for use in a motor vehicle as claimed in claim 17, wherein said controller is capable of controlling said actuating means by receiving an output from said speed sensor so as to increase the hardness of said seat member as the motor vehicle is increased in its speed.

19. A seat assembly for use in a motor vehicle as claimed in claim 17, wherein said controller is capable of controlling said actuating means by receiving an output from said steering angle detecting sensor so as to increase the hardness of said seat member at the time when a turning of the motor vehicle is detected.

20. A seat assembly for use in a motor vehicle as claimed in claim 17, wherein said hardness changing member is disposed within said seat back and said seat cushions.

21. A seat assembly for use in a motor vehicle as claimed in claim 20, wherein said seat member further comprises a pair of side support portions, each of which internally accommodates an air bag.

22. A seat assembly for use in a motor vehicle as claimed in claim 17, wherein said seat members further include a plurality of side supports, the hardness of which is also increased as the speed of the motor vehicle has been increased.

* * * * *